United States Patent
Yang et al.

(12) 
(10) Patent No.: US 6,803,338 B1
(45) Date of Patent: Oct. 12, 2004

(54) CATALYST FOR HOMO- OR CO-POLYMERIZATION OF ETHYLENE

(75) Inventors: Chun-Byung Yang, Taejon-shi (KR); Weon Lee, Taejon-shi (KR); Sang-Yull Kim, Taejon-shi (KR)

(73) Assignee: Samsung General Chemicals Co., Ltd., Chungcheongnam (KR)

( * ) Notice: Subject to any disclaimer, the term of this patent is extended or adjusted under 35 U.S.C. 154(b) by 275 days.

(21) Appl. No.: 09/870,990

(22) Filed: May 30, 2001

(30) Foreign Application Priority Data

Jun. 15, 2000 (KR) ........................................ 2000/32864

(51) Int. Cl.[7] .......................... B01J 31/00; B01J 37/00; C08F 4/02; C08F 4/60
(52) U.S. Cl. ..................................... 502/103; 502/121
(58) Field of Search .................................. 502/103, 121

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scatá et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scatá et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,399,054 A | 8/1983 | Ferraris et al. |
| 4,401,589 A | 8/1983 | Kioka et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,642,328 A | 2/1987 | Morterol et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |

(List continued on next page.)

FOREIGN PATENT DOCUMENTS

| | | |
|---|---|---|
| DE | 2 153 520 | 5/1972 |
| DE | 2 230 672 | 12/1972 |
| DE | 2 230 728 | 12/1972 |
| DE | 2 230 752 | 12/1972 |
| DE | 26 05 922 | 8/1976 |
| DE | 25 53 104 | 6/1977 |
| DE | 25 04 036 | 8/1978 |
| DE | 3636060 | 5/1988 |
| EP | 131832 | 5/1987 |
| EP | 0 350 170 | 3/1994 |
| EP | 0 606 125 | 5/1997 |
| EP | 0 602 922 | 1/1998 |
| GB | 1335887 | 10/1973 |
| GB | 1577643 | 10/1980 |
| JP | 52-028189 | 9/1977 |
| JP | 09-176226 | 7/1995 |

OTHER PUBLICATIONS

Abstracts of BE895019 published Mar. 1983, DE3241999 published May 1983, GB2111066 published Jun. 1983, and US4952649 published Aug. 1990, printed from Dialog Web.
Abstract of JP7316987 published Dec. 1995.
Abstract of JP52087486 published Jul. 1977.
Abstract of JP54040239 published Mar. 1979.
Abstract of JP58083006 published May 1983.
Abstract of JP63054004 published Mar. 1988.
Abstract of JP63191811 published Aug. 1988.
Abstract of JP63040711 published Feb. 1988.
Abstract of JP51136625 published Nov. 1976.

(List continued on next page.)

Primary Examiner—Anthony J. Green
Assistant Examiner—Jennine Brown
(74) Attorney, Agent, or Firm—Meyertons, Hood, Kivlin, Kowert & Goetzel, P.C.; Eric B. Meyertons

(57) ABSTRACT

The present invention relates to a catalyst for homo- or co-polymerization of ethylene, or more particularly to a solid titanium catalyst supported on a magnesium-containing carrier, having high catalytic activity and excellent polymerization properties, which can provide polymers of high bulk density and reduce the amount of polymers dissolvable in a medium during polymerization.

24 Claims, No Drawings

U.S. PATENT DOCUMENTS

| | | | |
|---|---|---|---|
| 4,952,649 A | 8/1990 | Kioka et al. | |
| 4,962,167 A | 10/1990 | Shiraishi et al. | |
| 4,970,186 A | 11/1990 | Terano et al. | |
| 4,978,648 A | 12/1990 | Barbé et al. | |
| 4,988,656 A | 1/1991 | Arzoumanidis et al. | |
| 4,990,479 A | 2/1991 | Ishimaru et al. | |
| 5,013,702 A | 5/1991 | Arzoumanidis et al. | |
| 5,059,570 A | 10/1991 | Bailly et al. | |
| 5,061,667 A | 10/1991 | Murata et al. | |
| 5,081,090 A | 1/1992 | Arzoumanidis et al. | |
| 5,104,838 A | 4/1992 | Fujita et al. | |
| 5,106,807 A | 4/1992 | Morini et al. | |
| 5,124,297 A | 6/1992 | Arzoumanidis et al. | |
| 5,130,284 A | 7/1992 | Terano et al. | |
| 5,134,104 A | 7/1992 | Sasaki et al. | |
| 5,175,332 A | 12/1992 | Chatterton et al. | |
| 5,182,245 A | 1/1993 | Arzoumanidis et al. | |
| 5,244,996 A | 9/1993 | Kawasaki et al. | |
| 5,419,116 A | 5/1995 | Rast et al. | |
| 5,459,116 A | 10/1995 | Ro et al. | |
| 5,502,128 A | 3/1996 | Flores et al. | |
| 5,585,317 A | 12/1996 | Sacchetti et al. | |
| 5,587,440 A | 12/1996 | Ehlers et al. | |
| 5,643,845 A | 7/1997 | Tajima et al. | |
| 5,726,261 A | 3/1998 | Sacchetti et al. | |
| 5,780,378 A | 7/1998 | Toida et al. | |
| 5,798,424 A | 8/1998 | Kong et al. | |
| 5,817,591 A | 10/1998 | Shamshoum et al. | |
| 5,844,046 A | 12/1998 | Ohgizawa et al. | |
| 5,849,654 A | 12/1998 | Fushimi et al. | |
| 5,849,655 A | 12/1998 | Shamshoum et al. | |
| 5,859,143 A * | 1/1999 | Tanaka et al. | 525/247 |
| 5,869,418 A | 2/1999 | Iiskola et al. | |
| 5,880,056 A | 3/1999 | Tsutsui et al. | |
| 5,936,049 A | 8/1999 | Kojoh et al. | |
| 5,965,478 A | 10/1999 | Goto et al. | |
| 5,968,862 A | 10/1999 | Abbott et al. | |
| 6,034,025 A * | 3/2000 | Yang et al. | 502/126 |
| 6,066,702 A | 5/2000 | Ro et al. | |
| 6,114,276 A | 9/2000 | Kong et al. | |
| 6,118,019 A * | 9/2000 | Fushimi et al. | 560/116 |
| 6,191,232 B1 * | 2/2001 | Mitsutani et al. | 525/323 |
| 6,214,759 B1 | 4/2001 | Chang et al. | |
| 6,231,804 B1 * | 5/2001 | Yamauchi et al. | 264/488 |
| 6,291,385 B1 | 9/2001 | Lee et al. | |
| 6,313,225 B2 * | 11/2001 | Saito et al. | 525/240 |
| 6,482,764 B1 | 11/2002 | Chang et al. | |
| 6,559,249 B2 * | 5/2003 | Yang et al. | 526/124.3 |
| 6,559,250 B2 * | 5/2003 | Ro et al. | 526/124.3 |
| 6,646,044 B1 * | 11/2003 | Watanabe et al. | 525/53 |
| 2002/0120079 A1 | 8/2002 | Ro et al. | |

OTHER PUBLICATIONS

Abstract of KR9202488 published Jan. 1990.

Abstract of KR9300665 published Sep. 1990.

Abstract of JP7316986 published Dec. 1995.

Abstract of CA1040379 published Oct. 1978.

Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623–2624, (no month).

Edelmann, "N–silylated benzamidines: versatile building blocks in main group and coordination chemistry," Coordination Chemistry Reviews, vol. 137, 1994, pp. 403–481, (no month).

Zhou et al., "Synthesis and Structure of Novel Bridged Dinuclear Indium Complexes," Inorg. Chem., 1996, vol. 35, pp. 1423–1424, (no month).

Zhou et al., "Bulky Amidinate Complexes of Tin(IV). Synthesis and Structure of Sn(RNC(R')NR)$_2$C$_2$(R=Cyclohexyl, R'=H, Me; R=SiMe$_{3,}$ $_{R'=}$Bu)," Inorg. Chem., 1997, vol. 36, pp. 501–504, (no month).

Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995. vol. 117, pp. 3008–3021, (no month).

Stokes et al., "Reactions of Cobaloxime Anions and /or Hydrides with Enynes as a New, General Route to 1,3– and 1,2–Dienylcobaloxime Complexes," Organometallics, 1996, vol. 15, pp. 2624–2632, no month.

* cited by examiner

US 6,803,338 B1

CATALYST FOR HOMO- OR CO-POLYMERIZATION OF ETHYLENE

FIELD OF THE INVENTION

The present invention relates to a catalyst for homo- or co-polymerization of ethylene, or more particularly to a solid titanium catalyst supported on a magnesium-containing carrier, having high catalytic activity and excellent polymerization properties, which can provide polymers of high bulk density and reduce the amount of polymers soluble in a medium during polymerization.

DESCRIPTION OF THE RELEVANT ART

Magnesium-containing catalysts for preparation of an ethylene polymer or copolymer are known to have a high catalytic activity and to be instrumental in production of polymers having a high bulk density. They are also known to be suitable for both liquid and gaseous phase polymerization alike. By the liquid phase ethylene polymerization is meant the polymerization reaction performed of bulk ethylene or in such media as isopentane and hexane, while the features important for the catalyst used in such polymerizations are high catalytic activity, the resultant polymer's high bulk density, etc. Apart from these, a salient variable to decide the quality of a catalyst, especially its commercial usefulness, is how much polymer remains soluble in the medium.

Many catalysts based on magnesium titanium along with the processes of their production have been reported. Uses of a magnesium solution intended to obtain a catalyst for polymerization of olefin having a high bulk density have also been learned. There are ways of obtaining magnesium solutions by means of reacting magnesium compounds with such electron donors as alcohol, amine, cyclic ether, organic carboxylic acid, etc, in the presence of hydrocarbon solvents. Of which, instances of using alcohol are disclosed in U.S. Pat. Nos. 4,330,649 and 5,106,807. A way of preparation of a magnesium-carrying catalyst by reacting a magnesium solution with such a halogen-containing compound as titanium tetrachloride is also well known. Attempts have been made by addition thereto of ester compounds to adjust the catalytic activity and the resultant polymer's molecular weight distribution. Such catalysts provide high bulk density of polymer, but have much yet to be improved in the aspects of the catalytic activity and the produced polymer's molecular weight distribution. Tetrahydrofuran, a cyclic ether, is in use as solvent for magnesium compounds in U.S. Pat. Nos. 4,777,639 and 4,518,706.

U.S. Pat. Nos. 4,847,227, 4,816,433, 4,829,037, 4,970,186, and 5,130,284 have disclosed processes for producing catalysts of excellent activity for polymerization of olefin having a high bulk density by reacting titanium chlorides with such electron donors as magnesium alkoxide, dialkyl phthalate, phthaloyl chloride, etc.

U.S. Pat. No. 5,459,116 has reported a process for preparation of a titanium-carrying solid catalyst by contact-reacting a magnesium solution containing, as electron donor, an ester having at least one hydroxy group with a titanium compound. Such processes make it possible to obtain a catalyst with a high catalytic activity, ensuring the produced polymer a high bulk density, but co-polymerization aspects have not been paid due heed.

SUMMARY OF THE INVENTION

As can be seen from the above, It is desirable that catalysts be developed for homo-and co-polymerization of ethylene that are simple in their production processes, yet have a high catalytic activity, and provide the produced polymers with a high bulk density, and give reduced soluble polymer left behind in the medium in slurry polymerization.

Hence the present invention, wherein it has been made possible to produce a catalyst of high activity from low-priced materials by means of a simple industrial process, the said catalyst being instrumental in preparation of polymers having a high bulk density and with less polymeric constituents soluble in the medium after the reaction. The actual steps and processes for production of the catalyst revealed in the present embodiment have never before been known in any existing patents or literature.

The present embodiment provides a solid catalyst of high catalytic activity for homo- and co-polymerization of ethylene, ensuring the polymer produced by the use of the catalyst with a high bulk density and excellent polymerization activity as well as reduced polymeric material to remain soluble in the medium.

The present embodiment also provides a method, simple yet practical, for producing the said solid catalyst.

The solid titanium catalyst, described herein, for homo- and co-polymerization of ethylene, excellent in catalytic activity and instrumental in production of polymers with a high bulk density and less polymer soluble in the medium, is produced by a simple yet effective process comprising Step (i) of producing a magnesium solution by contact-reacting a halogenated magnesium compound and alcohol, Step (ii) of reacting the solution with a phosphorus compound and an ester compound having at least one hydroxy group, and Step (iii) of adding thereto a mixture of a titanium compound and a silicon compound.

The kinds of halogenated magnesium compounds usable include such dihalogenated magnesiums as magnesium chloride, magnesium iodide, magnesium fluoride, and magnesium bromide; such alkylmagnesium halides as methylmagnesium halide, ethylmagnesium halide, propylmagnesium halide, butylmagnesium halide, isobutylmagnesium halide, hexylmagnesium halide, and amylmagnesium halide; such alkoxymagnesium halides as methoxymagnesium halide, ethoxymagnesium halide, isopropoxymagnesium halide, butoxymagnseium halide, and octoxymagnesium halide; and such an aryloxymagnesium halide as phenoxymagnesium halide or methylphenoxymagnesium halide. A mixture of two or more of these compounds can also be used. These magnesium compounds may be effective when they are used in the form of a complex with other metals.

The above-listed halogenated magnesium compounds may be represented by simple chemical formulae, but exceptions may arise from differences in the methods of their production. In such exceptional cases they generally can be regarded as mixtures of these listed magnesium compounds. For instance, the compounds obtained by reacting a magnesium compound with a polysiloxane compound, a halogen-containing silane compound, ester, or alcohol; the compounds obtained by reacting a magnesium metal with alcohol, phenol, or ether in the presence of halosilane, phosphorus pentachloride, or thionyl chloride may also be used. The preferable magnesium compounds are magnesium halides, especially magnesium chloride and alkylmagnesium chloride, preferably those that have $C_1$~$C_{10}$ alkyl groups; alkoxymagnesium chlorides, preferably those that have $C_1$~$C_{10}$ alkoxy groups; and aryloxy magnesium chlorides and preferably those that have $C_6$~$C_{20}$ aryloxy groups.

The magnesium solution may be produced with the aforesaid magnesium compounds by the use of an alcohol solvent in the presence or absence of a hydrocarbon solvent.

The kinds of hydrocarbon solvents which may be used for this purpose include, for instance, such aliphatic hydrocarbons as pentane, hexane, heptane, octane, decane, and kerosene; such alicyclic hydrocarbons as cyclobenzene, methylcyclobenzene, cyclohexane, and methylcyclohexane; such aromatic hydrocarbons as benzene, toluene, xylene, ethylbenzene, cumene, and cymene; and such halogenated hydrocarbons as dichloropropane, dichloroethylene, trichloroethylene, carbon tetrachloride, and chlorobenzene.

When a magnesium compound is turned into a solution, alcohol is used in the presence of any of the above-listed hydrocarbons. The kinds of alcohols used for this purpose include, for instance, such an alcohol, which contains from 1~20 carbons as methanol, ethanol, propanol, butanol, pentanol, hexanol, octanol, decanol, dodecanol, octadecylalcohol, benzylalcohol, phenylethylalcohol, isopropylbenzylalcohol, and cumyl alcohol. Of these, the preferable is such an alcohol which contains 1~12 carbons. The desired average size and distribution of particles of the catalyst may vary according to the kinds and total quantity of alcohol, the kinds of magnesium compounds, the ratio of magnesium to alcohol, etc., but the total quantity of alcohol to obtain the magnesium solution is at least 0.5mol to one mol of the magnesium compound, preferably about 1.0 mol~20 mols, and more preferably about 2.0 mols~20 mols.

The reaction of a magnesium compound with alcohol, in preparation of the solution, is preferably performed in a hydrocarbon medium, at the reaction temperature, though dependent upon the kinds and quantity of the alcohol, of about −25° C., preferably −10° C.~200° C., and still more preferably about 0° C.~150° C., The reaction preferably continues for about 30 minutes to four hours.

The phosphorus compound used as an electron donor in preparation of the catalyst is represented by the following general formula:

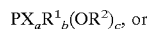

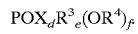

Here "X" is halogen atom or atoms; $R^1$, $R^2$, $R^3$, and $R^4$ are independently hydrocarbons having 1~20 carbons, for example alkyl, alkenyl, aryl groups, etc., and with a+b+c=3, $0 \leq a \leq 3$, $0 \leq b \leq 3$, $0 \leq c \leq 3$; d+e+f+3, $0 \leq d \leq 3$, $0 \leq e \leq 3$, $0 \leq f \leq 3$.

Actual examples of these include phosphorus tribromide, diethylchlorophosphite, diphenylchlorophosphite, diethylbromophosphite, diphenylbromophosphite, dimethylchlorophosphite, phenylchlorophosphite, trimethylphosphite, triethylphosphite, tri-n-bu-tylphosphite, trioctylphosphite, tridecylphosphite, triphenylphosphite, triethylphosphite, tri-n-butylphosphate, triphenylphosphate, etc., and, besides these, other phosphorus compounds, if they satisfy the above formula, can also be used. The quantity of these for use is adequately something below 0.25 mol to a mol of the magnesium compound, and more preferably 0.2 mol.

The ester compound containing at least one hydroxy group for use as another electron donor in the production of the catalyst may include, for example: such unsaturated aliphatic acid esters containing at least one hydroxy group as 2-hydroxy ethylacrylate, 2-hydroxy ethylmethacrylate, 2-hydroxy propylacrylate, 2-hydroxy propylmethacrylate, 4-hydroxy butylacrylate, and pentaerythritol triacrylate; such aliphatic monoesters or polyesters containing at least one hydroxy group as 2-hydroxy ethylacetate, methyl 3-hydroxy butylate, ethyl 3-hydroxy butylate, methyl 2-hydroxy isobutylate, ethyl 2-hydoxy isobutylate, methyl-3-hydroxy-2-methyl propionate, 2,2-di-methyl-3-hydroxy propionate, ethyl-6-hydroxy hexanoate, t-butyl-2-hydroxy isobutylate, diethyl-3-hydroxy glutarate, ethyl lactate, isopropyl lactate, butylisobutyl lactate, isobutyl lactate, ethylmandelate, dimethyl ethyl tartrate, ethyl tartrate, dibutyl tartrate, diethyl citrate, triethyl citrate, ethyl 2-hydroxy caproate, and diethyl bis-(hydroxy methyl) malonate; such aromatic esters containing at least one hydroxy group as 2-hydroxy ethyl benzoate, 2-hydroxy ethyl salicylate, methyl 4-(hydroxy methyl) benzoate, methyl 4hydroxy benzoate, ethyl 3-hydroxy benzoate, 4-methyl salicylate, ethyl salicylate, phenyl salicylate, propyl 4-hydroxy benzoate, phenyl 3-hydroxy naphthanoate, monoethylene glycol monobenzoate, diethylene glycol monobenzoate, and triethylene glycol monobenzoate; and such alicyclic esters containing at least one hydroxy group as hydroxy butyl lactone. The quantity of such an ester compound containing at least one hydroxy group should be 0.001 mol~5 mols to a mol of the magnesium, and preferably 0.01 mol~2 mols. The quantity of these should preferably be 0.05 mol~3 mols to one mol of the magnesium, and more preferably 0.1 mol~2 mols.

The temperature for the contact-reaction of the magnesium compound solution with a phosphorus compound and an ester compound containing at least one hydroxy group is adequately 0° C.~100° C., and more preferably 10° C.~70° C.

The magnesium compound solution which has been reacted with an ester compound containing at least one hydroxy group and a phosphorus compound is reacted with a mixture of a liquid titanium compound represented by the general formula $Ti(OR)_a X_{4-a}$ ("R" is a hydrocarbon group, "X" a halogen atom, and "a" a natural number from 0 to 4) and a silicon compound represented by the general formula $R_n SiCl_{4-n}$ ("R" is hydrogen; an alkyl, alkoxy, haloalkyl, or aryl group having 1~10 carbons; or a halosillyl or halosillylalkyl group having 1~8 carbons, and "n" is a natural number from 0 to 3), for crystallization of the particles of the catalyst.

The kinds of titanium compounds which satisfy the above general formula $Ti(OR)_a X_{4-a}$ include, for example, such tetrahalogenated titaniums as $TiCl_4$, $TiBr_4$, and $TiI_4$; such trihalogenated alkoxytitaniums as $Ti(OCH_3)Cl_3$, $Ti(OC_2H_5)Cl_3$, $Ti(OC_2H_5)Br_3$, and $Ti(O(i-C_4H_3)Br_3$; such dihalogenated alkoxy titaniums as $Ti(OCH_3)_2Cl_2$, $Ti(OC_2H_5)_2Cl_2$. $Ti(O(i-C_4H_9))_2Cl_2$, or $Ti(OC_2H_5)_2Br_2$; and such tetraalkoxy titaniums as $Ti(OCH_3)_4$, $Ti(OC_2H_5)_4$, and $Ti(OC_4H_9)_4$. Mixtures of the above titanium compounds may also be used. The preferable titanium compounds are halogen-containing compounds, and more preferably tetrachlorides of titanium.

The silicon compounds which satisfy the above general formula $RnSiCl_{4-n}$ include, for example, silicon tetrachloride; such trichlorosilanes as methyltrichlorosilane, ethyltrichlorosilane, and phenyltrichlorosilane; such dichlorosilanes as dimethyldichlorosilane, diethyldichlorosilane, diphenyldichlorosilane, and methylphenyldichlorosilane; and such monochloorsilanes as trimethylchlorosilane. The mixtures of these silicon compounds can also be used. The preferable silicon compound is silicon tetrachloride.

The quantity of the mixture of titanium and silicon compounds used in crystallization of the magnesium compound solution is adequately 0.1 mol~200 mols to a mol of the magnesium compound, preferably 0.1 mol~100 mols, and still more preferably 0.2 mol~80 mols. The molar ratio of titanium compound to silicon compound is adequately 1:0.05~0.95, preferably 1:0.1~0.8.

The shape and size of the solid matter crystallized by reaction of the magnesium compound solution with the mixture of titanium and silicon compounds greatly vary, dependant upon the reaction conditions. Therefore it is advisable to carry out the reaction at a sufficiently low temperature for formation of the solid constituents. Preferably, it is better to carry out a contact reaction at −70° C.~70° C., and more profitably at −50° C.~50°C. After the contact reaction the temperature is slowly raised and it is left at 50°C.~150° C. for 0.5 hour to five hours for sufficient reaction.

The solid particles obtained by the above-said reaction can be further reacted with a titanium compound. The titanium compound, which can be used for this purpose, is a titanium halide or a halogenated alkoxy titanium having 1 to 20 carbons in the alkoxy group. In some cases mixtures of these may also be used. Of these, the preferable is a titanium halide or a halogenated alkoxy titanium having one to eight carbons in the alkoxy group, and still more preferable is a titanium tetrahalide.

The solid titanium catalyst produced by the method provided herein is profitably used in homo- and co-polymerization of ethylene. This catalyst is especially preferably used in polymerization of ethylene and also in co-polymerization of ethylene with such α-olefins containing three or more carbons as propylene, 1-butene, 1-pentene, 4-methyl-1-pentene, and 1-hexene.

The polymerization reaction in the presence of the catalyst is performed with the use of (a) the solid titanium catalyst consisting of magnesium, titanium, halogen and an electron donor, and (b) a catalyst system consisting of compounds of the organometals of Groups 2, 12, or 13 on the periodic table of elements.

The solid complex titanium catalyst (a) can also be pre-polymerized in ethylene or α-olefin, prior to use as constituent in a polymerization reaction. The pre-polymerization can be performed in the presence of a hydrocarbon solvent like hexane at a sufficiently low temperature and under the law pressure conditions of ethylene or α-olefin in the presence of the aforesaid catalyst constituents and such an organic aluminum compound as triethylaluminum. Pre-polymerization makes catalyst particles wrapped in polymers to maintain the shape of the catalyst and thus helps to better the shape of the polymer after polymerization. The ratio in weight of polymer to catalyst after the pre-polymerization is usually 0.1:1~20:1.

The organometal compound (b) can be represented by the general formula: $MR_n$. Here "M" is a metal of Groups 2, 12, or 13 on the periodic table of elements, such as magnesium, calcium, zinc, boron, aluminum or gallium; "R" is an alkyl group having 1 to 20 carbons, such as methyl, ethyl, butyl, hexyl, octyl, or decyl; and "n" is the valence of the metal atom. For the more preferable organic metal compounds such trialkylaluminums containing an alkyl group of one to six carbons as triethylaluminum and triisobutylaluminum. Their mixtures are also commendable. In some cases such organic aluminum compounds containing one or more halogen or hydride groups as ethylaluminum dichloride, diethylaluminum chloride, ethylaluminum sesquichloride, or diisobutylaluminum hydride may be used.

The polymerization reaction may be performed in gaseous phase, in bulk in the absence of an organic solvent, or in a liquid slurry in the presence of an organic solvent. The reactions, however, are performed in the absence of oxygen, water, or any compounds that may act as catalytic poison.

In the case of liquid slurry polymerization, the preferable concentration of the solid complex catalyst, is about 0.00 Mmol~5 Mmols, more preferably about 0.001 mol~0.5 Mmols in terms of the number of titanium atoms in the catalyst to a liter of the solvent. For the solvent, such alkanes or cycloalkanes as pentane, hexene, heptane, n-octane, isooctane, cyclohexene, and methylcyclohexene, such alkylaromatics as toluene, xylene, ethylbenzene, isopropylbenzene, ethyltoluene, n-propylbenzene, and diethylbenzene, such halogenated aromatics as chlorobenzene, chloronaphthalene, and orthodichlorobenzene; and mixtures of these, are useful.

In the case of gaseous polymerization the quantity of the solid complex titanium catalyst (a) is about 0.001 Mmol~5 Mmols, preferably about 0.001 Mmol~1.0 Mmols, still more preferably about 0.01 Mmol~0.5 Mmols in terms of the number of titanium atoms to a liter of polymerization reaction volume.

The preferable concentration of the organometal compound (b) is about 1 mol~2,000 mols, more preferably about 5 mols~500 mols, in terms of the number of the atoms of the organometal to a mol of the titanium atoms in the catalyst (a).

To secure a high speed in polymerization the reaction is performed at a sufficiently high temperature regardless of the polymerization process. Generally, about 20° C.~200° C. are adequate, and more preferably 20° C.~95° C. The pressure of a monomer at the time of polymerization is adequately 1~100 atm, and more preferably 2~50 atm.

In the present invention, the molecular weight is expressed as a melt index (MI) (ASTM D1238), which is generally known in the art. The value of MI generally becomes greater as the molecular weight decreases.

The products obtained with the use of the catalyst are an ethylene polymer or copolymers of ethylene with α-olefin, having an excellent bulk density and fluidity. The yield of polymers is sufficiently high, requiring therefore no further process for removal of the residue of the catalyst.

Embodiment

The present invention is described in further detail below, through embodiment examples and comparative examples. The present invention is not limited to these examples.

EXAMPLE 1

Production of Catalyst

A solid complex titanium catalyst was prepared through the following three steps:

Step (i) Production of a magnesium solution

Into a 1.0-liter reactor equipped with a mechanic stirrer, converted into nitrogen atmosphere, 9.5 g of $MgCl_2$ and 500 ml of decane were introduced. The reactor was stirred at 300 rpm, 72 ml of 2-ethythexanol was added. The temperature was raised to 110° C., and the reaction was allowed to continue for three hours. The homogeneous solution obtained in this way was cooled to room temperature (250° C.).

Step (ii) Contact-reaction of the magnesium solution with a phosphorus compound and ester compound containing a hydroxy group To the above magnesium solution cooled to room temperature was added 5.1 ml of trietylphosphate and 2.4 ml of 2-hydroxyethylmethacrylate, and the solution was left to react for one hour.

Step (iii) Treatment with a mixture of titanium compound and a silicon compound

The above solution was adjusted to room temperature (25° C.), and to it a solution of a mixture of 70 ml of titanium tetrachloride and 70 ml of silicon tetrachloride was dripped for two hours. After the dripping the temperature of the reactor was raised to 80° C., for one hour, and the reactor was then kept at that temperature for another hour. After stirring was stopped, the solution at the top was separated, and to the solid layer left behind 300 ml of decane and 100 ml of titanium tetrachloride were added. The temperature was raised to 100° C. and kept at that temperature for two hours. After the reaction, the reactor was cooled to room temperature, and washed with 400 ml of hexane until unreacted titanium tetrachloride was completely removed. The titanium content of thus prepared solid catalyst was 5.1%.

Polymerization of Ethylene

A 2-liter high pressure reactor was dried in an oven, and assembled while it was hot. The inside of the reactor was converted into the nitrogen atmosphere by the alternating treatment with nitrogen and evacuation for three times. 1,00 ml of n-hexane was put into the reactor, and triethylaluminum by 2 mmol and the solid catalyst by 0.03 mmol in terms of the number of titanium atoms were added, followed by the addition of 1000 ml of hydrogen. While agitating at 700 rpm, the temperature of the reactor was raised to 80° C., and after adjusting the pressure of ethylene to 80 psi, polymerization was performed for an hour. After the polymerization, the reactor was cooled to room temperature, and a small amount of ethanol was added to the polymerized. The thus prepared polymer was then collected by separation, and dried in a vacuum oven at 50° C. for at least six hours to finally obtain polyethylene in the form of white powder.

Copolymerization of Ethylene With 1-Hexene

A 2-liter high-pressure reactor was dried in an oven, and assembled while hot. The inside of the reactor was converted in nitrogen atmosphere by the alternating treatment with nitrogen and evacuation three times. After pouring 1,000 ml of n-hexane into the reactor, 2mmol of triethylaluminum and 14.0 ml of 1-hexene were added thereto, and thereafter 200 ml of hydrogen was added. As the stirrer was turned at 700 rpm, the temperature of the reactor was raised to 80° C., 0.03 mmols of the catalyst in a bomb, fixed in advance to the reactor, was added to the reactor by the pressure of ethylene, adjusted to 80 psi. The remnants of the catalyst in the bomb were washed down to the reactor with a small quantity of hexane connected with the bomb. The reaction was allowed to continue for 20 minutes. After completion of the reaction, the reactor was lowered to room temperature, and the content of the reactor was separated into the produced polymer and hexane, the polymerization medium. The polymer was dried in a vacuum oven at 50° C. for six hours, to obtain polyethylene in the form of white powder.

The polymerization activity (kg polyethylene/g catalyst) was calculated in terms of the amount of the used catalyst (g) per the weight (kg) of the thus produced polymer. The results of the polymerization are given together with the polymer's bulk density, flow index (g/10 minutes), concentration, the quantity (wt%) of the polymer soluble in the medium, in Table 1.

EXAMPLE 2

The catalyst was produced using 7.2 ml of triethylphosphate and 2.4 ml of 2-hydroxy ethylmethacrylate in Step (ii) of the process for production of the catalyst in Example 1. The prepared catalyst's titanium content was 4.9%. Ethylene polymerization and ethylene/1-hexene copolymerization were carried out as in Example 1, the results being given in Table 1 below.

EXAMPLE 3

The catalyst was produced using 8.1 ml of tributylphosphate and 2.4 ml of 2-hydroxy ethylmethacrylate in Step (ii) of the process for production of the catalyst in Example 1. The prepared catalyst's titanium content was 4.7%. Ethylene polymerization and ethylene/1-hexene copolymerization were carried out as in Example 1, the results being given in Table 1 below.

EXAMPLE 4

The catalyst was produced using 8.1 ml of tributylphosphite and 2.4 ml of 2-hydroxy ethylmethacrylate in Step (ii) of the process for production of the catalyst in Example 1. The prepared catalyst's titanium content was 5.2%. Ethylene polymerization and ethylene/1-hexene copolymerization were carried out as in Example 1, the results being given in Table 1 below.

EXAMPLE 5

The catalyst was produced using 4.3 ml of diethylchlorophosphite and 2.4 ml of 2-hydroxy ethylmethacrylate in Step (ii) of the process for production of the catalyst in Example 1. The prepared catalyst's titanium content was 5.0%. Ethylene polymerization and ethylene/1-hexene copolymerization were carried out as in Example 1, the results being given in Table 1 below.

EXAMPLE 6

The catalyst was produced using 2.6 ml of phosphorus tetrachloride and 2.6 ml of 2-hydroxy ethylmethacrylate in Step (ii) of the process for production of the catalyst in Example 1. The prepared catalyst's titanium content was 4.6%. Ethylene polymerization and ethylene/1-hexene copolymerization were carried out as in Example 1, the results being given in Table 1 below.

EXAMPLE 7

The catalyst was produced using 7.2 ml of triethylphosphate and the same mols of 2-hydroxy ethylacrylate instead of 2-hydroxy ethylmethacrylate in Step (ii) of the process for production of the catalyst in Example 1. The prepared catalyst's titanium content was 4.5%. Ethylene polymerization and ethylene/l-hexene copolymerization were carried out as in Example 1, the results being given in Table 1 below.

EXAMPLE 8

The catalyst was produced using 7.2 ml of triethylphosphate and the same mols of diethyl-3-hydroxyglutarate instead of 2-hydroxy ethylmethacrylate in Step (ii) of the process for production of the catalyst in Example 1. The prepared catalyst's titanium content was 4.6%. Ethylene polymerization and ethylene/1-hexene copolymerization were carried out as in Example 1, the results being given in Table 1 below.

EXAMPLE 9

The catalyst was produced using 5.1 ml of triethylphosphate and 1.2 ml of 2-hydroxyethyl methacrylate in Step (ii) of the process for production of the catalyst in Example 1. The prepared catalyst's titanium content was 5.3%. Ethylene polymerization and ethylene/1-hexene copolymerization were carried out as in Example 1, the results being given in Table 1 below.

COMPARATIVE EXAMPLE 1

The catalyst was prepared as in Example 1 above, using only 5.1 ml of triethylphosphate without 2-hydroxy ethyl methacrylate in Step (ii) of the process for preparation of catalyst. The thus prepared catalyst's titanium content was 5.7%. Ethylene polymerization and ethylene/1-hexene Copolymerization were carried out as in Example 1, the results being given in Table 1 below.

COMPARATIVE EXAMPLE 2

The catalyst was prepared as in Example 1 above, but using only 2.4 ml of 2-hydroxyethyl methacrylate without triethylphosphate in Step (ii) of the process for preparation of catalyst. The thus prepared catalyst's titanium content was 5.1%. Ethylene polymerization and ethylene/1-hexene copolymerization were carried out as in Example 1, the results being given in Table 1 below.

COMPARATIVE EXAMPLE 3

The catalyst was prepared as in Example 1 above, not using either triethylphosphate or 2-hydroxy ethylmethacrylate in Step (ii) of the process for preparation of catalyst. The thus prepared catalyst's titanium content was 5.5%. Ethylene polymerization and ethylene/1-hexene copolymerization were carried out as in Example 1, the results being given in Table 1 below.

TABLE 1

| Examples | | Activity* | Bulk Density (g/ml) | Melting Index (g/10 min) | Density (g/ml) | Amount of Soluble Polymers (wt %) |
|---|---|---|---|---|---|---|
| 1 | Polymer | 3.9 | 0.37 | 3.8 | 0.967 | — |
|   | Copolymer | 12.5 | 0.26 | 0.72 | 0.941 | 0.72 |
| 2 | Polymer | 3.7 | 0.36 | 4.1 | 0.966 | — |
|   | Copolymer | 11.7 | 0.27 | 0.65 | 0.939 | 0.69 |
| 3 | Polymer | 4.1 | 0.37 | 3.9 | 0.965 | — |
|   | Copolymer | 13.8 | 0.26 | 0.82 | 0.938 | 0.61 |
| 4 | Polymer | 3.6 | 0.36 | 3.5 | 0.966 | — |
|   | Copolymer | 11.6 | 0.25 | 0.94 | 0.941 | 0.81 |
| 5 | Polymer | 3.6 | 0.36 | 3.3 | 0.965 | — |
|   | Copolymer | 11.9 | 0.25 | 0.86 | 0.94 | 0.80 |
| 6 | Polymer | 3.9 | 0.37 | 3.5 | 0.966 | — |
|   | Copolymer | 12.1 | 0.27 | 0.88 | 0.941 | 0.74 |

| Examples | | Activity* | Bulk Density (g/ml) | Melting Index (g/10 min) | Density (g/ml) | Amount of Soluble Polymers (wt %) |
|---|---|---|---|---|---|---|
| 7 | Polymer | 3.6 | 0.36 | 3.9 | 0.967 | — |
|   | Copolymer | 11.4 | 0.27 | 0.74 | 0.940 | 0.89 |
| 8 | Polymer | 3.6 | 0.36 | 3.3 | 0.966 | — |
|   | Copolymer | 11.2 | 0.26 | 0.69 | 0.938 | 0.89 |
| 9 | Polymer | 3.9 | 0.37 | 3.9 | 0.967 | — |
|   | Copolymer | 12.3 | 0.27 | 0.71 | 0.938 | 0.83 |
| Comp. 1 | Polymer | 3.2 | 0.30 | 2.2 | 0.967 | — |
|   | Copolymer | 9.3 | 0.12 | 0.31 | 0.951 | 1.81 |
| Comp. 2 | Polymer | 3.1 | 0.31 | 2.5 | 0.966 | — |
|   | Copolymer | 9.6 | 0.17 | 0.62 | 0.950 | 1.56 |
| Comp.3 | Polymer | 3.0 | 0.29 | 1.8 | 0.966 | — |
|   | Copolymer | 8.7 | 0.11 | 0.21 | 0.954 | 2.94 |

*(Kg PE/g catalyst, HR)

The catalyst prepared by the present invention herein for preparation of an ethylene polymer and copolymer, though simple in its production method, has such effects that it is excellent in its catalytic activity and polymerization activity alike, while the polymer produced with the catalyst has a high bulk density but less polymers soluble in the polymerization medium.

Further modification and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A solid titanium catalyst for homo- or co-polymerization of ethylene, wherein said catalyst is produced by the method comprising:
    (1) producing a magnesium solution by contact-reacting a mixture of a halogenated magnesium compound with alcohol;
    (2) reacting said magnesium solution with a phosphorus compound and an ester compound having at least one hydroxy group; and
    (3) adding a mixture of a titanium compound and a silicon compound thereto.

2. The catalyst of claim 1, wherein the phosphorus compound comprises a compound represented by a general formula of $PX_a R^1_b (OR^2)_c$ or $POX_d R^3_e (OR^4)_f$, in which X is a halogen atom; $R^1$, $R^2$, $R^3$, and $R^4$ are hydrocarbons having 1~20 carbons of an alkyl, alkenyl, or aryl group, either identical with or different from each other, with a+b+c=3, $0 \leq a \leq 3$, $0 \leq b \leq 3$, $0 \leq c \leq 3$, and d+e+f=3, $0 \leq d \leq 3$, $0 \leq e \leq 3$, $0 \leq f \leq 3$.

3. The catalyst of claim 1, wherein the phosphorus compound comprises: phosphorus trichloride, phosphorus tribromide, diethylchlorophosphite, diphenylchlorophosphite, diethylbromophosphite, diphenylbromophosphite, dimethylchlorophosphite, phenylchlorophosphite, trimethylphosphite, triethylphosphite, tri-n-butylphosphite, trioctylphosphite, tridecylphosphite, triphenylphosphite, triethylphosphate, tri-n-butylphosphate, or triphenylphosphate.

4. The catalyst of claim 1, wherein the ester compound having at least one hydroxy group comprises: an unsaturated aliphatic acid ester having at least one hydroxy group; an aliphatic monoester or polyester having at least one hydroxy group; an aromatic ester having at least one hydroxy group; or an alicyclic ester compound having at least one hydroxy group.

5. The catalyst of claim 1, wherein the titanium compound is represented by a general formula of $Ti(OR)_a X_{4-a}$, in which R is a hydrocarbon group, X is a halogen atom, and a is a natural number of 0~4; and wherein the silicon compound is represented by a general formula of $R_n SiCl_{n-4}$, in which R is hydrogen, an aryl, alkoxy, haloalkyl or alkyl group having 1~10 carbon atoms, or a halosilylalkyl or halosilyl group having 1~8 carbon atoms, and n is a natural number of 0~3.

6. The catalyst of claim 1, wherein the titanium compound comprises: a 4-halogenated titanium; a 3-halogenated alkoxytitanium; a 2-halogenated alkoxytitanium; or a tetralkoxy titanium; and wherein the silicon compound comprises: silicon tetrachloride; a trichlorosilane; a dichlorosilane; or a monochlorosilane.

7. The catalyst of claim 1, wherein the titanium compound is titanium tetrachloride, and the silicon compound is silicon tetrachloride.

8. The catalyst of claim 1, wherein the ester compound having at least one hydroxy group comprises: 2-hydroxy ethylacrylate; 2-hydroxy ethylmethacrylate; 2-hydroxy propylacrylate; 2-hydroxy propylmethacrylate; 4-hydroxy butylacrylate; pentaerithritol triacrylate; 2-hydroxy ethyl acetate; methyl 3-hydroxy butylate; ethyl 3-hydroxy butylate; methyl 2-hydroxy isobutylate; ethyl 2-hydroxy isobutylate; methyl-3-hydroxy-2-methyl propionate; 2,2-dimethyl-3-hydroxy propionate; ethyl-6-hydroxy hexanoate; t-butyl-2-hydroxy isobutylate; diethyl-3-hydroxy glutarate; ethyl-lactate; isopropyl lactate; butyl-isobutyl lactate; isobutyl lactate; ethyl mandelate; dimethyl ethyl tartrate; ethyl tartrate; dibutyl tartrate; diethyl citrate; triethyl citrate; ethyl-2-hydroxy-caproate; diethyl bis-(hydroxymethyl) malonate; 2-hydroxy ethyl benzoate; 2-hydroxy ethyl salicylate; methyl-4-(hydroxy methyl) benzoate; methyl-4-hydroxy benzoate; ethyl-3-hydroxy benzoate; 4-methyl salicylate; ethyl salicylate; phenyl salicylate; propyl-4-hydroxy benzoate; phenyl-3-hydroxy naphthanoate; monoethylene glycol monobenzoate; diethylene glycol monobenzoate; triethylene glycol monobenzoate; or hydroxy butyl-lactone.

9. The catalyst of claim 1, wherein the titanium compound is represented by a general formula of $Ti(OR)_aX_{4-a}$, in which R is a hydrocarbon group, X is a halogen atom, and a is a natural number of 0~4.

10. The catalyst of claim 1, wherein the titanium compound comprises: $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))$, $Ti(OCH_3)_2Cl_2$, $Ti(OC_2H_5)_2Cl_2$, $Ti(O(i-C_4H_9)_2)Cl_2$, $Ti(OC_2H_5)_2Br_2$, $Ti(OCH_3)_4$, $Ti(OC_2H_5)_4$, or $Ti(OC_4H_9)_4$.

11. The catalyst of claim 1, wherein the silicon compound is represented by a general formula of $R_nSiCl_{n-4}$, in which R is hydrogen, an aryl, alkoxy, haloalkyl or alkyl group having 1~10 carbon atoms, or a halosilylalkyl or halosilyl group having 1~8 carbon atoms, and n for a natural number of 0~3.

12. The catalyst of claim 1, wherein the silicon compound comprises silicon tetrachloride, trichlorosilane, methyltrichlorosilane, ethyltrichlorosilane, phenyltrichlorosilane, dimethylchlorosilane, diethyldichlorosilane, diphenyldichlorosilane, methylphenyldichlorosilane, or trimethylchlorosilane.

13. A method of forming a catalyst for homo- or co-polymerization of ethylene, comprising:
producing a magnesium solution by contact-reacting a mixture of a halogenated magnesium compound with alcohol;
reacting said magnesium solution with a phosphorus compound and an ester compound having at least one hydroxy group; and
adding a mixture of a titanium compound and a silicon compound thereto.

14. The method of claim 13, wherein the phosphorus compound comprises a compound represented by a general formula of $PX_aR^1_b(OR^2)_c$ or $POX_dR^3_e(OR^4)_f$, in which X is a halogen atom; $R^1$, $R^2$, $R^3$, and $R^4$ are hydrocarbons having 1~20 carbons of an alkyl, alkenyl, or aryl group, either identical or different from each other, with a+b+c=3, $0 \leq a \leq 3$, $0 \leq b \leq 3$, $0 \leq c \leq 3$, and d+e+f=3, $0 \leq d \leq 3$, $0 \leq e \leq 3$, $0 \leq f \leq 3$.

15. The method of claim 13, wherein the phosphorus compound comprises: phosphorus trichloride, phosphorus tribromide, diethylchlorophosphite, diphenylchlorophosphite, diethylbromophosphite, diphenylbromophosphite, dimethylchlorophosphite, phenylchlorophosphite, trimethylphosphite, triethylphosphite, tri-n-butylphosphite, trioctylphosphite, tridecylphosphite, triphenylphosphite, triethylphosphate, tri-n-butylphosphate, or triphenylphosphate.

16. The method of claim 13, wherein the ester compound having at least one hydroxy group comprises: an unsaturated aliphatic acid ester having at least one hydroxy group; an aliphatic monoester or polyester having at least one hydroxy group; an aromatic ester having at least one hydroxy group; or an alicyclic ester compound having at least one hydroxy group.

17. The method of claim 13, wherein the titanium compound is represented by a general formula of $Ti(OR)_aX_{4-a}$, in which R is a hydrocarbon group, X is a halogen atom, and a is a natural number of 0~4; and wherein the silicon compound is represented by a general formula of $R_nSiCl_{n-4}$, in which R is hydrogen, an aryl, alkoxy, haloalkyl or alkyl group having 1~10 carbon atoms, or a halosilylalkyl or halosilyl group having 1~8 carbon atoms, and n is a natural number of 0~3.

18. The method of claim 13, wherein the titanium compound comprises: a 4-halogenated titanium; a 3-halogenated alkoxytitanium; a 2-halogenated alkoxytitanium; or a tetralkoxy titanium; and wherein the silicon compound comprises: silicon tetrachloride; a trichlorosilane; a dichlorosilane; or a monochlorosilane.

19. The method of claim 13, wherein the titanium compound is titanium tetrachloride, and the silicon compound is silicon tetrachloride.

20. The method of claim 13, wherein the ester compound having at least one hydroxy group comprises: 2-hydroxy ethylacrylate; 2-hydroxy ethylmethacrylate; 2-hydroxy propylacrylate; 2-hydroxy propylmethacrylate; 4-hydroxy butylacrylate; pentaerithritol triacrylate; 2-hydroxy ethyl acetate; methyl 3-hydroxy butylate; ethyl 3-hydroxy butylate; methyl 2-hydroxy isobutylate; ethyl 2-hydroxy isobutylate; methyl-3-hydroxy-2-methyl propionate; 2,2-dimethyl-3-hydroxy propionate; ethyl-6-hydroxy hexanoate; t-butyl-2-hydroxy isobutylate; diethyl-3-hydroxy glutarate; ethyl-lactate; isopropyl lactate; butyl-isobutyl lactate; isobutyl lactate; ethyl mandelate; dimethyl ethyl tartrate; ethyl tartrate; dibutyl tartrate; diethyl citrate; triethyl citrate; ethyl-2-hydroxy-caproate; diethyl bis-(hydroxymethyl) malonate; 2-hydroxy ethyl benzoate; 2-hydroxy ethyl salicylate; methyl-4-(hydroxy methyl) benzoate; methyl4-hydroxy benzoate; ethyl-3-hydroxy benzoate; 4-methyl salicylate; ethyl salicylate; phenyl salicylate; propyl-4-hydroxy benzoate; phenyl-3-hydroxy naphthanoate; monoethylene glycol monobenzoate; diethylene glycol monobenzoate; triethylene glycol monobenzoate; or hydroxy butyl-lactone.

21. The method of claim 13, wherein the titanium compound is represented by a general formula of $Ti(OR)_aX_{4-a}$, in which R is a hydrocarbon group, X is a halogen atom, and a is a natural number of 0~4.

22. The method of claim 13, wherein the titanium compound comprises: $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))$, $Ti(OCH_3)_2Cl_2$, $Ti(OC_2H_5)_2Cl_2$, $Ti(O(i-C_4H_9)_2)Cl_2$, $Ti(OC_2H_5)_2Br_2$, $Ti(OCH_3)_4$, $Ti(OC_2H_5)_4$, or $Ti(OC_4H_9)_4$.

23. The method of claim 13, wherein the silicon compound is represented by a general formula of $R_nSiCl_{n-4}$, in which R is hydrogen, an aryl, alkoxy, haloalkyl or alkyl group having 1~10 carbon atoms, or a halosilylalkyl or halosilyl group having 1~8 carbon atoms, and n for a natural number of 0~3.

24. The method of claim 13, wherein the silicon compound comprises silicon tetrachloride, trichlorosilane, methyltrichlorosilane, ethyltrichlorosilane, phenyltrichlorosilane, dimethylchlorosilane, diethyldichlorosilane, diphenyldichlorosilane, methylphenyldichlorosilane, or trimethylchlorosilane.

* * * * *